United States Patent [19]

Bossand et al.

[11] Patent Number: 4,684,391
[45] Date of Patent: Aug. 4, 1987

[54] ORGANIC AMELIORATORS PROTECTED BY A HYDROCARBON STRUCTURE ALLOWING THE IMPROVEMENTS OF SOIL PROPERTIES

[75] Inventors: Bernard Bossand, Communay; Jacques Eppe, Ajaccio; Alain Faure, St. Chamond; Gilles Leygue, Vernaison, all of France

[73] Assignee: ELF France, Paris, France

[21] Appl. No.: 800,353

[22] Filed: Nov. 21, 1985

Related U.S. Application Data

[63] Continuation of Ser. No. 331,687, Dec. 17, 1981, abandoned.

[30] Foreign Application Priority Data

Dec. 17, 1980 [FR] France .................................. 80 26766

[51] Int. Cl.⁴ .............................................. C05F 11/02
[52] U.S. Cl. ............................................ 71/24; 71/27; 71/903; 71/904; 71/DIG. 1
[58] Field of Search .................. 44/32.1; 71/1, 11, 24, 71/27, 903, 904, DIG. 1

[56] References Cited

U.S. PATENT DOCUMENTS 3,422,569  1/1969  Lyon ................................... 71/24 X
3,705,793  12/1972  Mikhelis et al. ....................... 71/24
3,883,989  5/1975  Melvold ............................ 44/32 X

FOREIGN PATENT DOCUMENTS 1247  of 1909  United Kingdom ................ 44/32.1

*Primary Examiner*—Ferris H. Lander
*Attorney, Agent, or Firm*—Burgess, Ryan & Wayne

[57] ABSTRACT

Process of manufacture of solid and liquid organic soil ameliorators characterized in that while stirring at between 20° C. and 70° C. an aqueous suspension of substance rich in organic matter is incorporated to a hydrocarbon based aqueous emulsion, the mixture obtained being, as necessary, filtered in order to remove excess water;

Solid and liquid organic ameliorators constituted by an organic matter coated by 0.25 to 25% by weight hydrocarbon; applications for the improvement of soils for agricultural and horticultural cultivation, re-timbering and ballasting of oil tankers.

12 Claims, No Drawings

ORGANIC AMELIORATORS PROTECTED BY A HYDROCARBON STRUCTURE ALLOWING THE IMPROVEMENTS OF SOIL PROPERTIES

This application is a continuation of application Ser. No. 331,687 filed Dec. 17, 1981, now abandoned.

The present invention concerns the preparation of organic soil ameliorators in solid or liquid form, protected by a hydrocarbon structure, and the use of said ameilorators to modify the quality of and improve soils having a low content in or impoverished in organic matter.

Indeed, the improvement of tillage yields from soils impoverished in organic matter is a difficult task. The lack of organic matter in soils is evidenced by an insufficiency as to:
the biological activity rate of the soil
the water retention capacity
the ion exchange capacity
the structural stability of the soil.

On the other hand, numerous processes tend to lower the level of organic matter in the soil. For example, in the case of soils of arid, lateritic or desert regions, the loss by rain wash and leaching must be added to the loss by physicochemical oxidation (heat, ultra-violet rays): the level of organic matter drops very rapidly with time, causing a steep drop in biological activity. An identical phenomenon is observed in soils having been subjected to fire, for which a quasi-total destruction of organic matter and soil sterilisation is observed.

The present invention concerns the preparation of solid or liquid organic ameliorators protected by a hydrocarbon structure, allowing the reduction of organic matter losses:
through destruction, and photochemical route due to the presence of a protective screen absorbing the ultra-violet rays (hydrocarbon structure);
through leaching and rain wash due to the hydrophilic modification of the organic ameliorators conferred by the hydrocarbon structure: a sharp deceleration of the removal of organic matte by mineralisation and percolation, while the removal connected with radicular pumping is only slightly modified.

Another important advantage resulting from this protection of the organic ameliorator is that the development of microorganism is enhanced since the inside of the organic matter grains is isolated from harmful effects (heat andultr-violet rays, for example).

The selected biodegradable hydrocarbon base has a half-life span in the soil long enough to allow a durable protection (longer than two years), leading to a restoration of the soil in organic matter.

The organic ameliorators protected by a hydrocarbon structure according to the invention are obtained from a substance rich in fermentable organic matter in divided form, recoated by a fine film of hydrocarbon base.

The substances rich in organic matter that can be used are peat, leaf-mould, river or marsh sludge, natural dehydrated or artificial manure, grape marc, compost, tree bark, vegetal residue, leaf-mould bed used for mushroom cultivation known as "mushroom bed", digested or non-digested urban sludges or any other substance rich in organic matter.

The hydrocarbon base can be a direct distillation bitumen, a residue from distillation at atmospheric pressure or under vacuum, a viscoreduction residue or any diluted heavy petroleum product in an organic solvent, for example asphalts or asphaltenes.

The organic ameliorators according to the present invention are prepared, either by slow incorporation, under stirring, of an aqueous suspension of substances rich in organic matter, or by malaxing the said product, reduced to a water content comprised between 50% and 100% by weight, to an aqueous solution of a hydrocarbon base in a quantity such that the weight quantity of hydrocarbon is from 0.25 to 25% with respect to the dry matter. These emulsions are of the same type as those used in road materials, containing by weight 20 to 70% bitumen, 70 to 20% water and 1 to 10% of a cationic-type emulsifying agent (fatty amine or diamine polyoxyethylated or non-polyoxyethylated ) having the advantage of being easily absorbed from all the substances containing mineral or polar particles. After stirring from 15 minutes to 2 hours at a temperature comprised between 20° and 70° C, the mixture is filtered and dried in order t supply the solid organic ameliorator protected by a hydrocarbon structure according to the present invention.

The prepared mixtures can be used directly in liquid form, without being filtered or dried, and have good decantation stability due to the presence of surfactants acting as dispersant. This stability can be further improved by adjunction of various surfactive or polymeric-type additives selected from the group of phenols, alcohols, ethoxylated acids, metallic sulfonates and soaps or polymethacrylates.

These mixtures correspond to the liquid organic ameliorator according to the present invention.

The solid organic ameliorator according to the present invention can be used in wide-scale cultivation at amounts comprised between 5 and 50 t/ha, and in horticultural cultivation at amounts comprised between 5 and 100 t/ha, and preferably between 10 and 50 t/ha. One of the preferred applications of these solid organic ameliorators is the re-timbering of dry or arid land, or following a fire. In this case distribution is preferably effected "in a hole" at the foot of the tree. The amounts used are comprised between 5 and 50 kg per tree, and preferably between 10 and 40 kg per tree.

The liquid organic ameliorators according to the present invention can be used as ballast for oil tankers during the return voyage of the ship towards the production areas which are often, especially those of the Middle East, arid countries in which the development of agricultural production requires the contribution to the soil of organic matter. These liquid ameliorators can also be used in irrigated zones, using for their distribution the existing irrigation network, since the pumpability of these products is very good.

Another important advantage of the solid organic ameliorators according to the present invention is that non-hydrosoluble fertilisers, such as tricalcic phosphates, can be easily incorporated. For this, it is necessary to introduce into the reactor the requisite quantity of said ameliorators, before adjunction of emulsified hydrocarbon base.

The preparation of solid or liquid organic ameliorators protected by a hydrocarbon structure will be better understood in the light of the following non-limiting examples. All the percentages given are by weight.

EXAMPLE 1

970 g of an intermediary product between sludge and peat, known as "Noir de Briere", that is found in the department of France called Loire Atlantique, are dispersed with 1 l water; to the obtained suspension stirred at ambient temperature, are slowly added 51.8g of an emulsion formed of 58.5% road bitumen 40/50 in water.

After 1 hour of stirring, the mixture is filtered and dried at ambient temperature and pressure in order to supply an organic ameliorator containing 28% dry matter and 17.5% hydrocarbon with respect to the dry matter.

EXAMPLE 2

If operating is carried out as specified in Example 1, but 6g chalk is added before incorporation of the bitumen emulsion (41g instead of 51g), an organic ameliorator containing 22% dry matter, 14% bitumen with respect to the dry matter and 4.5.% chalk is obtained.

EXAMPLE 3

970g household refuse compost manufactured at Chalon sur Saone by the company called BIOTEX are dispersed in 2.5 l water by stirring at ambient temperature during 30 minutes. 17g emulsion formed of 60% road bitumen 40/50 manufactured by the company GERLAND are added and the mixture is stirred during 1 hour at 25° C.

After filtration, the organic ameliorator obtained contains 44% dry matter and 12% bitumen with respect to the said dry matter.

EXAMPLE 4

50 kg of leaf-mould known as "mushroom bed" are malaxed in a concrete mixer with 25 kg water and 1000 g aqueous emulsion containing 50% of viscoreductio residue fluxed at 80cSt at 100° C. with domestic fuel oil (DFO). The obtained product is filtered and gives an organic ameliorator containing 35% dry matter and 2% bitumen.

EXAMPLE 5

100 kg product known as "Noir de Briere" are vigorously stirred with 100 l water; then 2kg of emulsion formed of 60% bitumen 40/50 are added. After one hour of vigorous stirring the thus prepared ver stable liquid mixture can be used. It contains 12% dry matter and 5% bitumen.

We claim:

1. A process of making a soil ameliorator comprising a substance rich in fermentable organic matter in divided form coated with a film of a residual hydrocarbon base, said substance being selected from the group consisting of peat, leaf mould, river sludge, marsh sludge, natural dehydrated manure, artificial manure, grape marc, compost, tree bark, vegetal residue, leaf-mould bed used for mushroom cultivation, digested urban sludge and non-digested urban sludges, and said hydrocarbon base being selected from the group consisting of direct distillation bitumen, a residue from hydrocarbon distillation at atmospheric pressure, a residue from vacuum distillation of hydrocarbon visoreduction residue, asphalts, asphaltenes and road bitumens, which process comprises:

(a) incorporating, under stirring
  (1) an aqueous suspension of said substance, having 50%-100% by weight of water and
  (2) an amount of an aqueous emulsion of said residual hydrocarbon base containing 7%-20% by weight of water sufficient to provide from 0.25% to 25% by weight of said hydrocarbon base based on the total solids;

(b) stirring for 15 minutes to 2 hours;

(c) at a temperature of from 20° to 70° C.

2. A process according to claim 1 wherein the substance rich in organic matter is selected from the group consisting of compost, leaf mold bed used for mushroom cultivation and "Noir de Briere".

3. A process according to claim 1 wherein the hydrocarbon base is a heavy petroleum product diluted in an organic solvent.

4. A process according to claim 3, wherein said heavy residual hydrocarbon base comprises asphalts or asphaltenes.

5. A process according to claim 3, wherein the aqueous emulsion of hydrocarbon base contains 20% to 70% by weight hydrocarbon, 70% to 20% water and 1 to 10% cationic surfactant.

6. A process according to claim 1, wherein the aqueous emulsion of hydrocarbon base contains 20% to 70% by weight hydrocarbon base, 70% to 20% water and 1 to 10% cationic surfactant.

7. A process according to claim 1, further comprising enriching the resulting mixture by adding between 1% and 20% by weight of fertiliser with respect to the total solids.

8. A process according to claim 1, further comprising stablizing the resulting mixture by adding 0.01% to 1% by weight of an additive selected from the group consisting of polymeric surfactants and polymeric-type additives.

9. A process according to claim 8, wherein said polymeric-type additive is selected from the group consisting of phenols, alcohols, ethoxylated acids, metallic sulfonates and soaps, and polymethacrylates.

10. A method of ameliorating soil by applying a solid or liquid organic ameliorator according to claim 1, for the improvement of large-scale cultivation in an amount between 10 and 50 t/ha, and for re-timbering of dry, arid or burnt land in an amount of between 5 and 50 kg per tree.

11. A process according to claim 1, further conprising filtering the resulting mixture to eliminate excess water.

12. A method of ameliorating soil by applying a solid organic ameliorator according to claim 11, for the improvement of large-scale cultivation in an amount between 10 and 50 t/ha, and for re-timbering of dry, arid or burnt land in an amount of 5 and 50 kg. per tree.

* * * * *